United States Patent
Cerra

(10) Patent No.: US 6,546,373 B1
(45) Date of Patent: Apr. 8, 2003

(54) SYSTEM AND METHOD FOR RECOVERING REFUNDABLE TAXES

(75) Inventor: Peter J. Cerra, White Plains, NY (US)

(73) Assignee: MasterCard International Incorporated, Purchase, NY (US)

(*) Notice: Subject to any disclaimer, the term of this patent is extended or adjusted under 35 U.S.C. 154(b) by 0 days.

(21) Appl. No.: 09/232,555

(22) Filed: Jan. 18, 1999

(51) Int. Cl.[7] ............................................. G06F 17/60
(52) U.S. Cl. .............................. 705/19; 705/39; 705/21
(58) Field of Search ............................. 705/19, 39, 21

(56) References Cited

U.S. PATENT DOCUMENTS

| | | | | |
|---|---|---|---|---|
| 3,596,256 A | * | 7/1971 | Alpert et al. | 340/172.5 |
| 5,202,825 A | * | 4/1993 | Miller et al. | 364/405 |
| 5,613,160 A | * | 3/1997 | Kraslavsky et al. | 395/836 |
| 5,739,512 A | * | 4/1998 | Tognazzini | 235/380 |
| 5,774,872 A | * | 6/1998 | Golden et al. | 705/19 |
| 5,852,812 A | * | 12/1998 | Reeder | 705/39 |

FOREIGN PATENT DOCUMENTS

| | | | | |
|---|---|---|---|---|
| CI | 2215435 | * | 2/1998 | G07F/17/26 |
| EP | 0823695 | * | 2/1998 | G07F/7/08 |

OTHER PUBLICATIONS

"Tourist Card launch next year", NBC, National Computer Board, Singapore Tourist Promotion Board, STPB Straits Times, p46, Sep. 8, 1995.*

Berss, Marcia; "Get the VAT back, Jack (value–added tax on items purchased in Europe)"; Forbes; v135; p219(2), May 20, 1985.*

"Siemens Nixdorf wins support contract with Selfridgers, London on back of orders for terminals"; Computergram International; n2560; pN/A, Sep. 8, 1995.*

"ADP e–XPENSE Services releases version 5 of its Automated Expense Reporting System with Java capabilities"; Business Wire; p08041466, Sep. 8, 1995.*

Wade, Betsy, "V.A.T. Refunds: Vexations Added," *New York Times*, Oct. 11, 1998.

* cited by examiner

*Primary Examiner*—Vincent Millin
*Assistant Examiner*—Pedro R. Kanof
(74) *Attorney, Agent, or Firm*—Baker Botts L.L.P.

(57) ABSTRACT

A system for recovering refundable taxes such as value-added taxes (VAT) uses a transaction card, such as a credit or debit or electronic cash card, to record purchases made by a traveler that are subject to VAT in a foreign country. The traveler loads the transaction card with a software application that is able to record the purchases subject to VAT. The traveler uses the card to make purchases in the foreign country, and the card calculates and accumulates the VAT subject to refund. When leaving the foreign country, the traveler inserts the card into a terminal, the software application reads the VAT subject to refund, and the traveler selects whether to receive the refunded VAT in cash in local currency or in the currency of the country in which the traveler resides ("home currency"), as cash value on the card (if a cash or debit card), as a credit on the card (if a credit card), or by check in local or home currency.

20 Claims, 14 Drawing Sheets

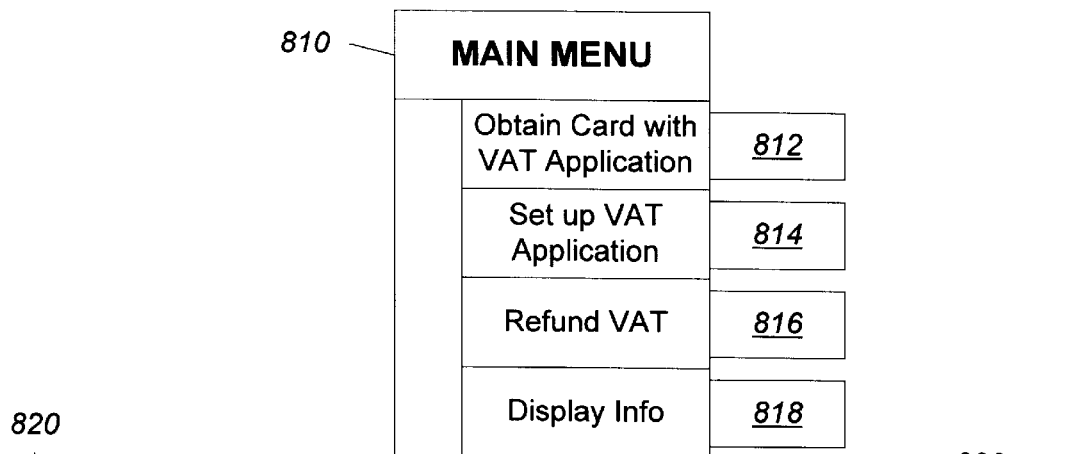
FIG. 8A
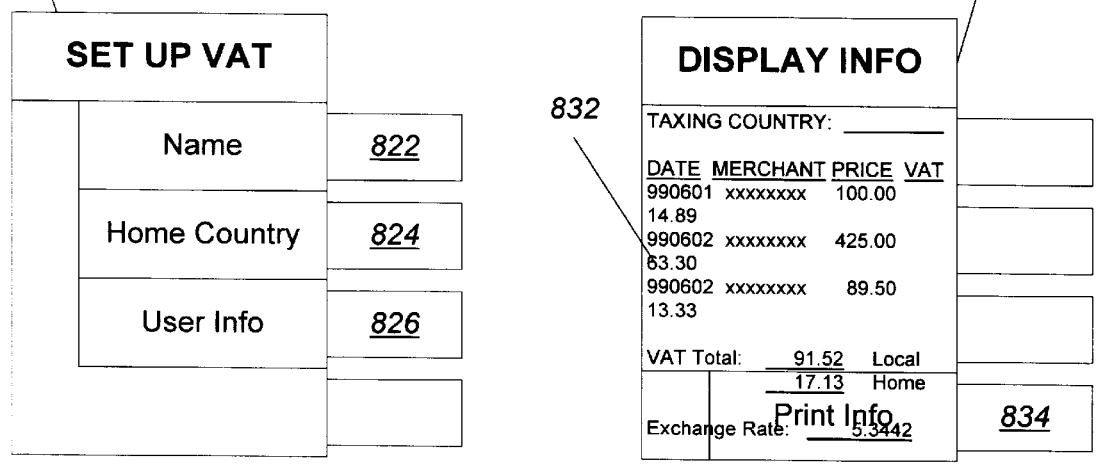
FIG. 8B
FIG. 8C
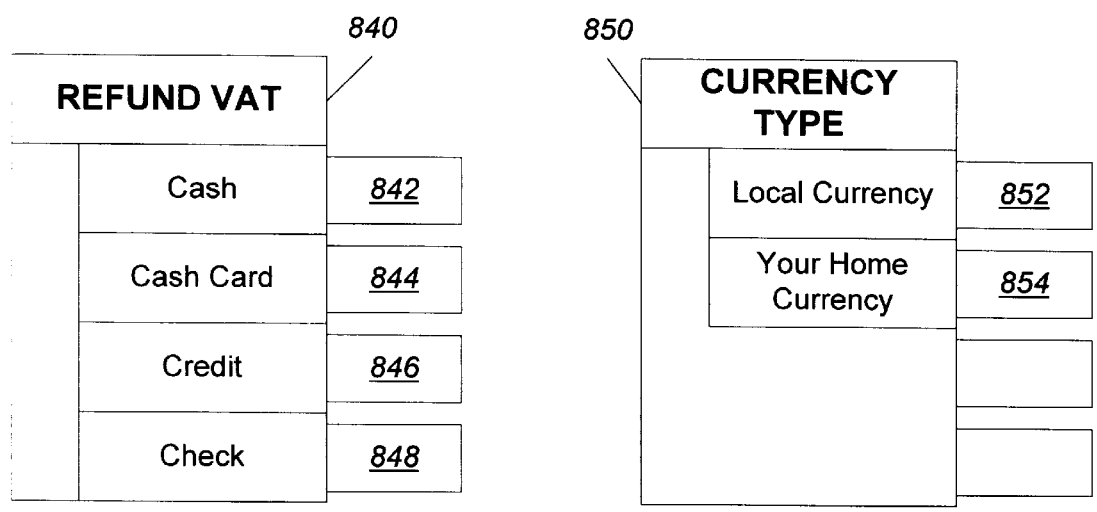
FIG. 8D
FIG. 8E

FIG. 9A

910 — VAT Refund Application (912)

914
- Date:
- Card No.:
- Term. No.:
- Term. Loc.:

916 — Transaction: Setup VAT App.

918 — Home Country: _____

920 — Name:

FIG. 9B

930 — VAT Refund Application

934
- Date:
- Card No.:
- Term. No.:
- Term. Loc.:

Taxing Country: _____

Transaction:     Display Info

938 — PURCHASES

| DATE | MERCHANT | PRICE | VAT |
|------|----------|-------|-----|
| 990601 | xxxxxxx | 100.00 | 14.89 |
| 990602 | xxxxxxx | 425.00 | 63.30 |
| 990602 | xxxxxxx | 89.50 | 13.33 |

Total VAT Paid:   91.52   Local
                  17.13   Home

Exchange Rate:    5.3442

940

942 — Name:

FIG. 9C

950 — VAT Refund Application

- Date:
- Card No.:
- Term. No.:
- Term. Loc.:

954 — Taxing Country: _____

Transaction:     Refund VAT

958 — PURCHASES

| DATE | MERCHANT | PRICE | VAT |
|------|----------|-------|-----|
| 990601 | xxxxxxx | 100.00 | 14.89 |
| 990602 | xxxxxxx | 425.00 | 63.30 |
| 990602 | xxxxxxx | 89.50 | 13.33 |

Amt VAT Refunded:   91.52   Local
                    17.13   Home

Exchange Rate:      5.3442

Method of Refund:   Cash

Currency of Refund: Local

960

964 — Name:

SYSTEM AND METHOD FOR RECOVERING REFUNDABLE TAXES

FIELD OF THE INVENTION

This invention relates to performing financial transactions with cards and to using such cards to automate recovery of refundable taxes generated from the transactions such as a value-added tax.

BACKGROUND OF THE INVENTION

In the United States, nearly every state and many municipalities assess sales taxes ranging from one percent to more than ten percent on goods and services purchased within the state, including food and other products. These taxes are imposed at the point-of-sale ("POS") as a surcharge on the articles bought. Many other countries assess national sales taxes or value-added taxes ("VAT") on many goods and services purchased within those countries. In Canada, for example, the Goods and Services Tax runs about 7%, with some provinces adding an additional surcharge for Provincial Taxes. In Europe, these value-added taxes are generally more than ten percent and can be as much as 25% in Denmark and Sweden, although not all goods and services are taxed at the same rate. The United Kingdom, for example, imposes a 17.5% VAT on most articles purchased there. Generally, the advertised price of these goods and services already includes the VAT.

Value-added taxes are imposed for a variety of reasons. They may be used to raise money for a taxing authority, to discourage spending on certain items, or to redistribute the burden of taxation among different elements of the tax base. Value-added taxes are charged on both finished products and intermediate products, i.e., at each step that adds value in the manufacturing process.

In many countries, however, in order to promote exports, some of these VATs are refundable to non-resident visitors subject to a variety of conditions. Generally, if a non-resident purchases an article that is used outside of that country, the visitor can recoup at a later date the money paid as a VAT.

The current methods for obtaining VAT refunds vary among the different countries. Some countries allow the visitor to apply for the refund upon departure, perhaps in a duty-free section of an airport or a duty-free store near the border. However, the visitor must collect the receipts, determine which purchases are refundable, fill out the refund form (assuming it is written in a language the visitor can understand), and wait in line, only to receive the refund in the currency of the country from which the visitor is about to depart.

Canada provides one example of a process for recovering a VAT refund. That process requires a visitor to mail from outside of the country the refund form with the original receipts. The governmental agency can take six or more weeks to process the refund, and the refund is sent to the visitor in Canadian dollars, thus requiring the visitor to incur currency conversion charges.

The United Kingdom provides another example of such a process, requiring two steps to recover refundable VATs. First, each time a visitor makes a purchase for which the VAT is refundable, the visitor must establish eligibility for the refund program by showing the merchant a passport or other form of identification. Some merchants or countries may require a minimum purchase in one store visit or on one item in order to qualify for a refund. Assuming that the visitor has overcome these hurdles, the visitor and the merchant must then fill out a refund document (voucher) provided by the merchant.

Then, while departing from the European Union, the visitor must present the vouchers and the accompanying goods to a Customs agent and obtain a certification form from the agent. (The visitor cannot obtain a certification form after leaving the European Union.) Once outside of the European Union, the visitor must mail back the certified voucher to each retailer from whom a refund is sought. That retailer will then process the refund, subtract a processing fee, and send a sterling check to the visitor, who must then convert the check into a more usable currency.

In some countries, the visitor must spend a minimum amount of money on purchases in order to qualify for a refund. If, for example, this minimum is $500, and the VAT is 25%, then a visitor who spends just under $500 could potentially be losing nearly $125.

Thus, although VAT refunds are available, they may be extremely inconvenient to obtain. From an economic standpoint, the VAT makes goods relatively more expensive for foreign purchasers, acting as a disincentive for potential customers to spend money. On the other hand, to recoup some of the VAT may act as an incentive for foreigners to make purchases in the visited country, but only if recovery of the refund is convenient.

It would therefore be advantageous to reduce the financial and transaction costs and burdens of participating in the refund process, particularly in purchasing the goods, retaining receipts, and applying for a refund.

SUMMARY OF THE INVENTION

It is therefore an object of the present invention to present a system and a method for recovering refundable taxes that streamlines the paperwork and the morass of differing rules and restrictions that plagues a visitor attempting to recover a refundable tax such as a VAT.

The method stores on a transaction card a tax recovery application and data related to a purchase transaction. Using the tax recovery application, the method then calculates a refundable tax in response to the purchase transaction data. More specifically, the invention provides the refundable tax, preferably the VAT, to the card user.

Because the transaction card may support several applications besides the tax recovery application, it is not necessary to store the tax recovery application on the card at the time it is obtained. Once stored, though, it is preferable that the tax recovery application determine the home or residence country ("home country") of the card user.

The types of purchase transaction data that may be stored on the card are the transaction date, the price charged for the transaction, the country in which the tax is being levied ("taxing country"), and the amount of the refundable tax paid during the transaction.

Preferably, the refundable tax is calculated by determining whether the current transaction is subject to refundable tax, calculating the amount of refundable tax associated with the current transaction, and adding the amount of the refundable tax for the current transaction to the amount of refundable tax stored on the card for prior transactions. It is preferable that refundable tax from more than one taxing country may be refunded using the tax recovery application.

In addition, it is preferable that the method can refund the tax in a number of ways and in a choice of currencies. For example, the tax can be refunded in cash, by adding cash value to the card, by crediting the card user's credit card account, or by issuing a check to the card user. These refunds may be made in either the currency of the taxing country or in the currency of the home country.

A system in accordance with the present invention includes the transaction card, a transaction terminal into which the card is inserted and that executes purchase transactions and generates purchase transaction data, and the tax recovery application which is stored on the card and which calculates the refundable tax in response to the purchase transaction data. Preferably, the transaction terminal is able to transfer the tax recovery application from an application provider to the card.

As with the method of the present invention, the system includes a means to provide the refundable tax, preferably the VAT, to the card user. In addition, because the transaction card may support several applications, it is not necessary to store the tax recovery application on the card at the time it is obtained.

Also part of the present invention is the transaction card itself. Such a card includes means for storing the tax recovery application, means for transferring purchase transaction data from an electronic purchasing terminal to the card, means for calculating the refundable tax, in response to the purchase transaction data, using the tax recovery application, and means for transferring refundable tax data from the card to an electronic refund terminal.

More specifically, the card includes means for storing the cash value of the refundable tax, which is preferably a VAT. As with the method of the present invention, it is preferable that the cash value of the refundable tax is stored in either the currency of the taxing country or in the currency of the home country. It is preferable that the electronic refund terminal be an ATM-type terminal, a computer connected to the Internet, or a computer connected via a modem to the tax recovery application provider.

BRIEF DESCRIPTION OF THE DRAWINGS

Further objects, features and advantages of the invention will become apparent from the following detailed description taken in conjunction with the accompanying figures showing illustrative embodiments of the invention, in which:

FIGS. 8A–8E are examples of menus displayed on the screens of the terminals illustrated in FIGS. 4A–4C; and FIGS. 9A–9C are examples of receipts issued by the terminals illustrated in FIGS. 4A–4C.

Figure 1A:
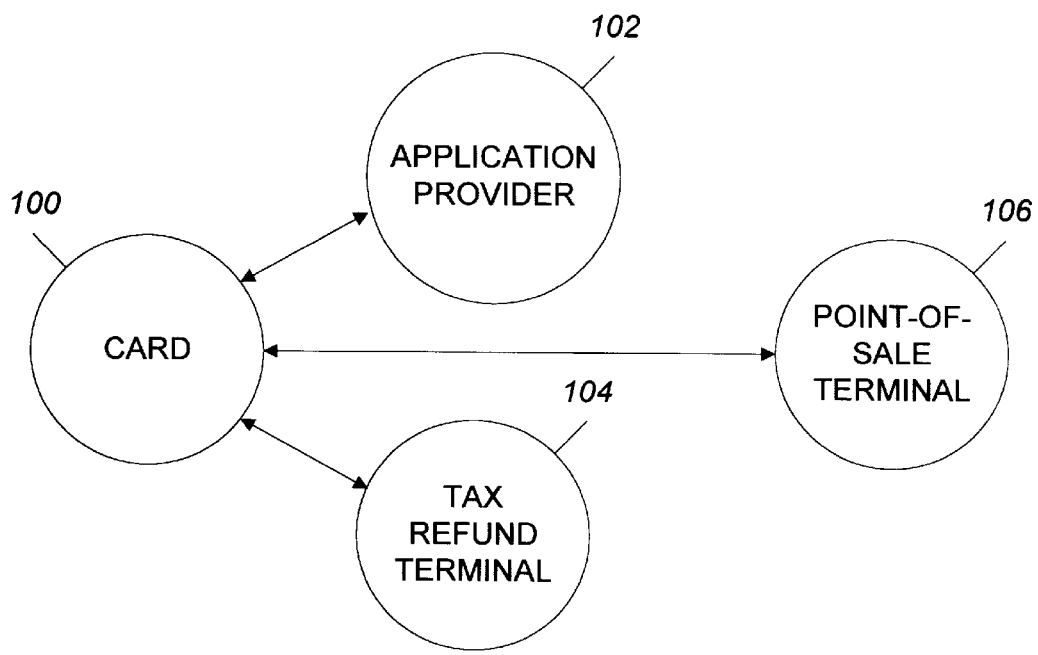
FIG. 1A is a diagram of the interacting parts of a system for recovering refundable taxes in accordance with the invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

In accordance with the system of the present invention, a traveler visiting a foreign, taxing country can use a transaction card to make purchases and then receive a refund on the card of refundable taxes such as VATs. The system includes the transaction card, a tax recovery application provider, a transaction terminal, and a point-of-sale ("POS") terminal. The transaction terminal has a processor and interface hardware and software to interact with the card. If not included within the interface, the transaction terminal may have a separate card reader. Also part of the system are external networks such as those belonging to the taxing authority or those with financial or banking information. This system facilitates the loading of the tax recovery application on the card, the payment for goods or services, the calculation of the refundable taxes, the refund of the taxes, and the accounting and security associated with those functions.

A traveler visiting a taxing country may load the tax recovery application onto the card by using a terminal or kiosk in communication with a remote source via the Internet or a telephone modem. Using such a connection, once the tax recovery application has been loaded on the card, a cardholder in her home country may make a purchase from a merchant in a taxing country, and, if that purchase is subject to refundable tax, may invoke the tax recovery application to recover a refund for that purchase.

The transaction card is preferably an integrated circuit ("IC") card (also called a "smart card"), which is typically the size of a conventional credit card, but which contains a microprocessor. The card can be used to perform financial transactions, but can have other non-financial uses such as storing health records, travel preferences, telephone information, and retailer loyalty program information. The microprocessor can execute one or more of these applications stored on the card. In the preferred embodiment, the IC card can perform credit, debit, or electronic cash card functions, or any combination of the three, that allow a cardholder to make purchases. Transaction data can also be recorded on the card.

During a purchase transaction, the tax recovery application on the card determines which items are subject to the refundable tax, calculates how much tax has been paid for those items, and accumulates on the card the paid taxes as the cardholder goes from store to store making purchases. During departure from the taxing country, the visitor places the card in a terminal in the departure port and receives the appropriate refund for the taxes paid during the trip in the taxing country. The refund can be paid, for example, in "local" (i.e., the taxing country's) currency or in the currency of the country in which the cardholder resides ("home currency"), by placing electronic cash value on the card. Alternatively, the refund can also be paid by check, either in local currency or in the cardholder's home currency, by credit to the cardholder's credit card, or by some other method.

The tax recovery application is programmed to keep track of the types of purchases that are subject to the refundable tax, and the amounts of those taxes, thus freeing travelers and merchants from having to maintain cumbersome records. It is preferable that one tax recovery application be able to process transactions in multiple countries, although it is also possible for each application to be dedicated to a single country.

The system, as illustrated in FIG. 1A, includes card 100, application provider 102, tax terminal 104, and POS terminal 106. A cardholder loads onto card 100 the tax recovery application supplied by application provider 102. The taxing authority that authorizes the tax likely licenses approved suppliers or provides tax recovery application software. The taxing authority may also operate a host database. The cardholder makes purchases in the taxing country using card 100 at POS terminals 106. When leaving the taxing country, the cardholder inserts card 100 into tax terminal 104, recovers the refundable taxes paid in the taxing country, and stores the value refunded back on card 100.

There are many benefits of this system. The cardholder benefits by receiving refunds on all eligible purchases; by receiving a refund promptly, upon departure rather than six or more weeks later; by not having to keep track of receipts or refund vouchers or the different refund rules for different countries; by not having to fill out applications that are difficult to understand, and by being able to receive a refund in the cardholder's home currency or on a credit card. Merchants benefit by not having to handle refunds themselves, by attracting customers who are willing to spend money knowing that they will receive a refund, and by not having to check the eligibility of customers or explain the eligibility rules to the customers. The taxing authority benefits by automating the refund process, by not having to hire or contract for personnel to handle refund requests at the airport or in the office, by being able to keep track of VAT refund data with little added work, and by knowing that the application processing is secure.

Figure 1B:
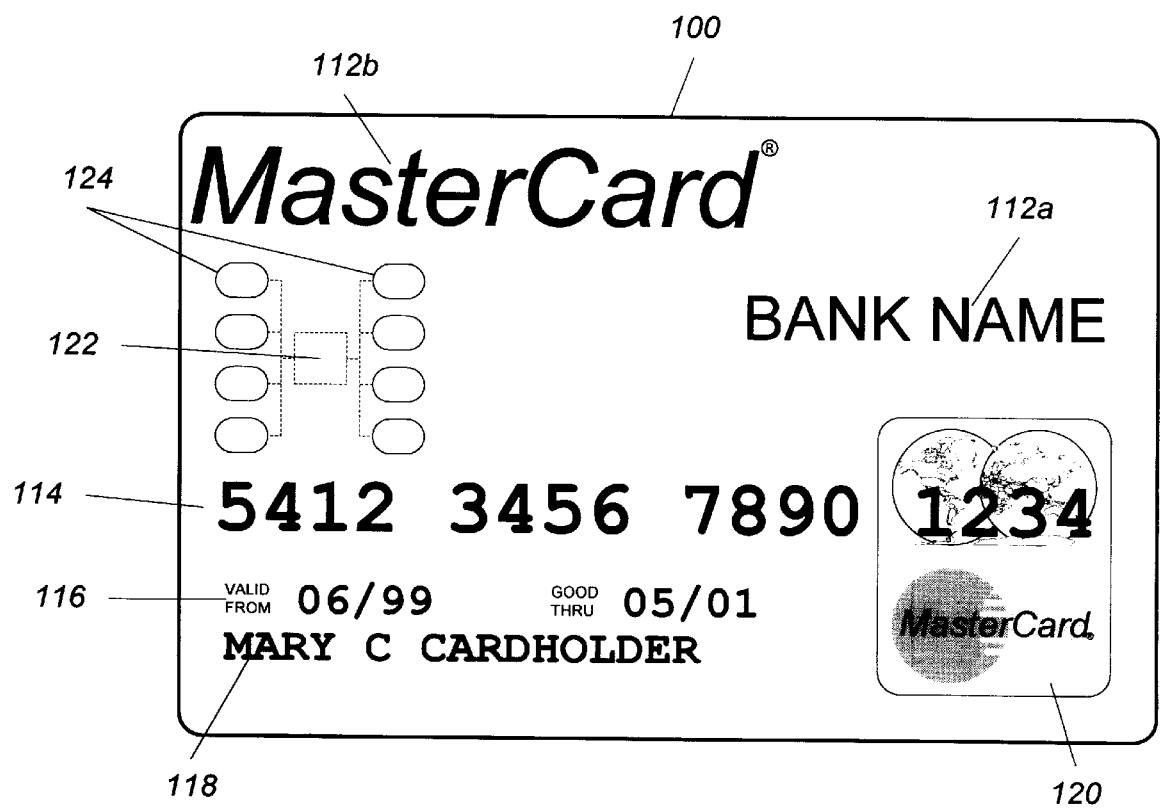
FIG. 1B illustrates a transaction card incorporating integrated circuit technology.

FIG. 1B illustrates a typical transaction card 100 incorporating integrated circuit technology that can be used with the presently claimed invention. Card 100 looks similar to a conventional credit card, but also includes integrated circuit (IC) 122, which contains a microprocessor, and electrical contacts 124 for communication between IC 122 and devices external to card 100. Card 100 can be used as a credit card, a debit card, or as an electronic cash card, i.e., a card containing monetary value that can be transferred when the cardholder makes purchases. An example of an electronic cash card is a card with the MONDEX™ electronic cash application. Similar to the conventional credit card, the front side of card 100 preferably contains either the name 112a of the financial institution that issues the card or the name 112b of the payment system (e.g., MasterCard®) under whose authority the card is issued, or both, the cardholder's account number 114, the cardholder's name 118, the dates 116 between which the card is valid and usable, and the brand 120 associated with the payment system.

Figure 2A:
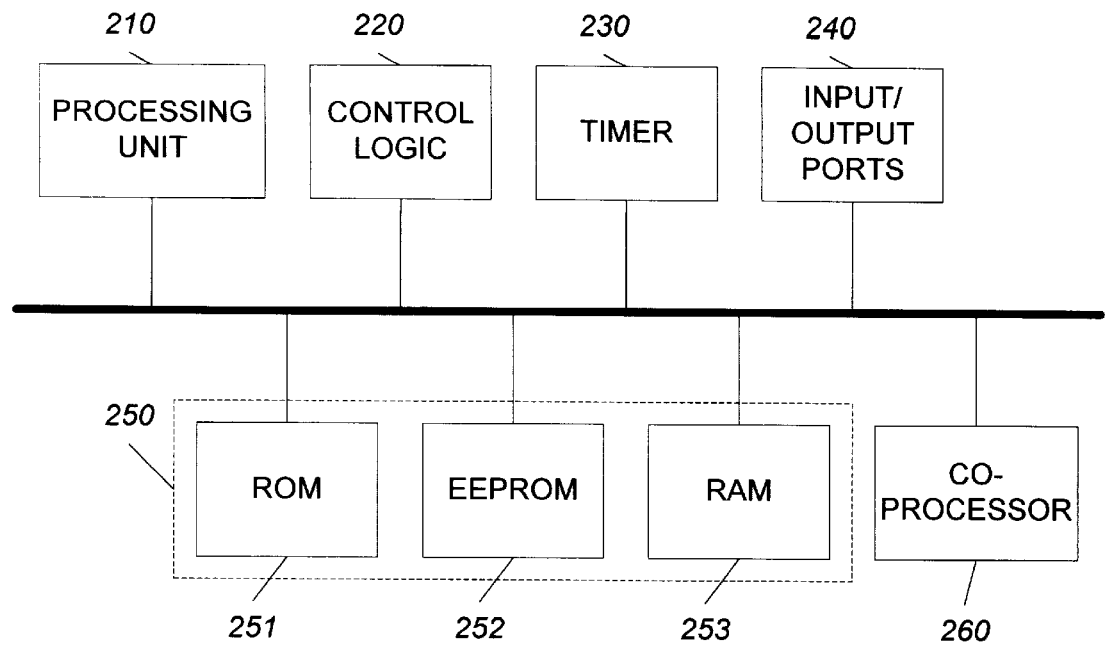
FIG. 2A is a functional block diagram of the integrated circuit section of the card illustrated in FIG. 1B.

FIG. 2A is a functional block diagram of the IC section 122 and contains at least processing unit 210 and memory unit 250. Preferably, IC 122 also includes control logic 220, a timer 230, and input/output ports 240. IC section 122 can also include a co-processor 260. Control logic 220 provides, in conjunction with processing unit 210, the control necessary to handle communications between memory unit 250 and input/output ports 240. Timer 230 provides a timing reference signal for processing unit 210 and control logic 220. Co-processor 260 provides the ability to perform complex computations in real time, such as those required by cryptographic algorithms.

Memory unit 250 may include different types of memory, such as volatile and non-volatile memory and read-only and programmable memory. For example, as shown in FIG. 2A, memory unit 250 may include read-only memory (ROM) 251, electrically erasable programmable read-only memory (EEPROM) 252, and random-access memory (RAM) 253.

Memory unit 250 stores IC card data such as secret cryptographic keys and a user's personal identification number ("PIN"). The secret cryptographic keys may be any type of well-known cryptographic keys, such as the private keys of public-key pairs. Preferably, the secret cryptographic keys are stored in a secure area of ROM or EEPROM that is either not accessible or has very limited accessibility from outside the IC card.

Memory unit 250 also stores the operating system of the IC card. The operating system loads and executes IC card applications and provides file management and other basic card services to the IC card applications. One operating system that can be used to implement the present invention is the MULTOS™ operating system licensed by Mondex International Ltd. Preferably, the operating system is stored in ROM 251.

In addition to the basic services provided by the operating system, memory unit 250 may also include one or more IC card applications. For example, a MasterCard® Credit/Debit application could be stored on card 100. Additionally, if the IC card is to be used as an electronic cash card, the MONDEX™ electronic cash application might be included on the IC card, which electronically loads onto the IC card a value of a certain currency from a cardholder's account in a financial institution. An application may include both program and data files, which may be stored in either ROM or EEPROM.

Figure 2B:
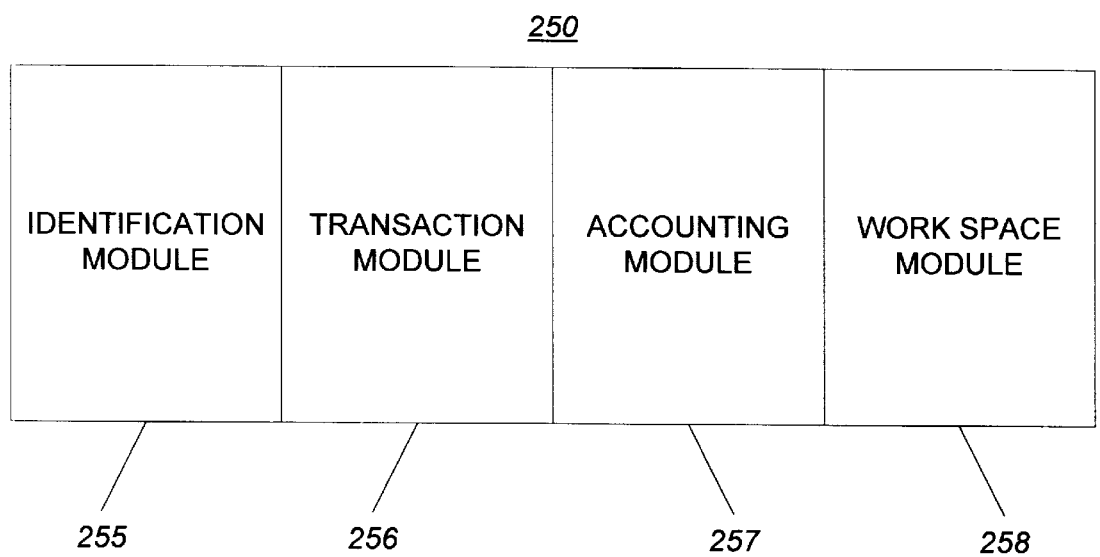
FIG. 2B is a map of memory space provided in the card illustrated in FIG. 1B.

FIG. 2B is a memory map of data stored in memory unit 250, and includes four modules. Identification module 255 preferably contains the account number, the card number (which may be different from the account number), the dates the card is valid, a PIN, and a maximum number of PIN entry attempts. Transaction module 256 preferably contains purchase data, including date and time, store name, store location, amount of purchase, and, in accordance with the present invention, the amount of refundable tax associated with each purchase. Accounting module 257 contains code which calculates the accumulated tax information for each country for which the tax recovery application has been loaded. Work space module 258 accompanies these three modules and is used for storing data temporarily.

Figure 3:
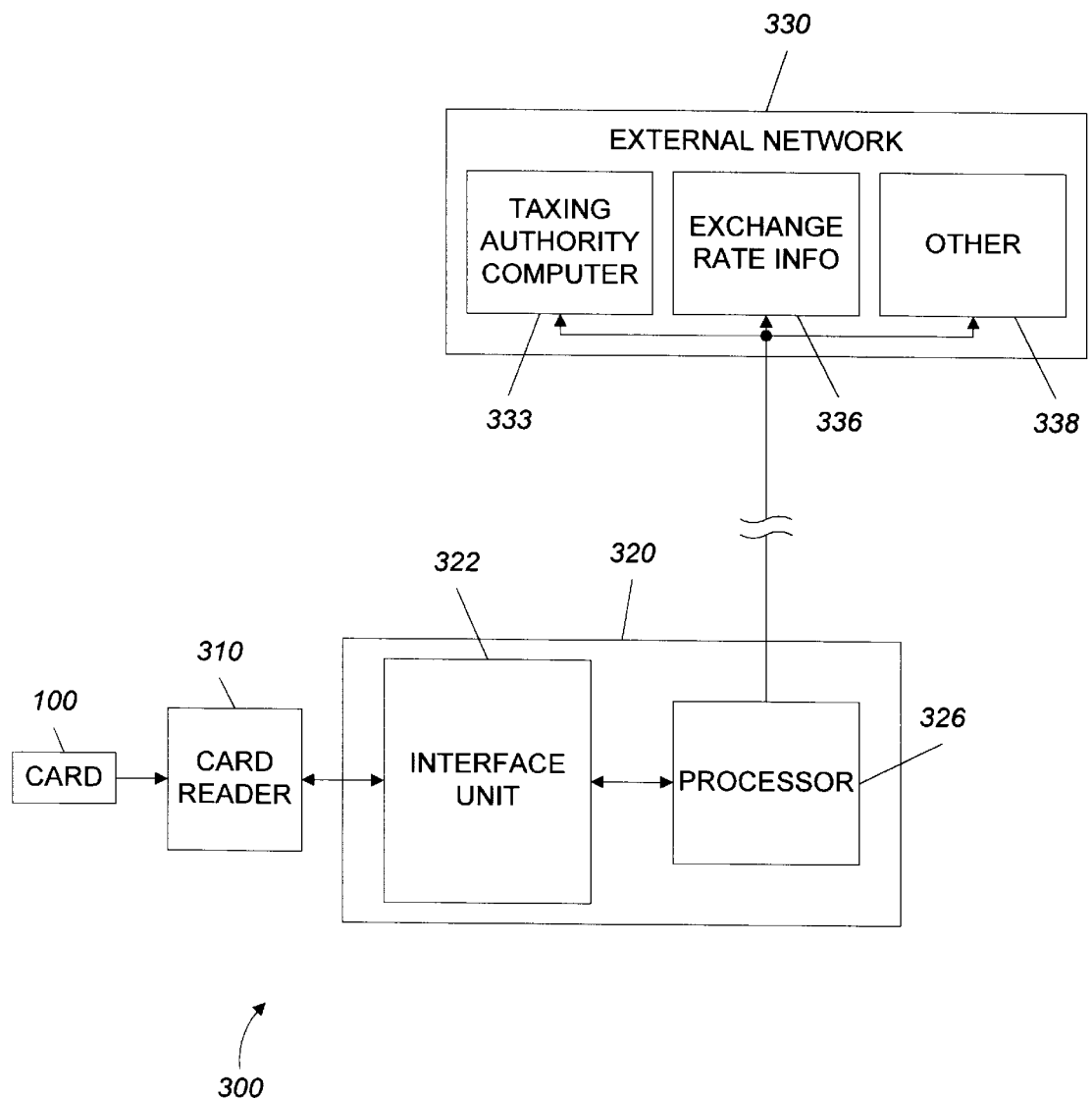
FIG. 3 is a block diagram of a part of the system in FIG. 1A using the card of FIG. 1B.

FIG. 3 is a block diagram of a system 300 for recovering refundable taxes. System 300 includes a terminal 320. As used in this specification and the appended claims, the term "terminal" generically describes devices with which an IC card may communicate. Several examples of terminals are pictured in FIGS. 4A–4C, including a kiosk-type terminal 410 shown in FIG. 4A. Also shown are a personal computer 470 that operates as a terminal via an Internet connection as shown in FIG. 4B and via a modem connection (internal or external) through a telephone line as shown in FIG. 4C.

Within terminal 320 are interface unit 322 and processor 326. Interface unit 322 may consist of a combination of hardware and software, including a CRT screen or other display means, designed to communicate with a cardholder, and buttons, keypads, or keyboards with which a cardholder inputs data to the terminal. Interface unit 322 may also include a card reader into which the cardholder inserts card 100 in order to exchange data. Alternatively, the card reader could be external to interface unit 322 as shown by card reader 310.

Processor 326 communicates with interface unit 322 and processes the commands and data provided to the terminal by the cardholder. Processor 326 also communicates with devices outside of the terminal and not directly accessible to the cardholder, such as external network 330. In accordance with the invention, such external network might contain the taxing authority computer 333, a database 336 containing current exchange rate information, or other external computers 338. This communication can be accomplished, for example, using standard short- and long-distance communication networks such as local- and wide-area networks, or via telephone-based or wireless communication lines or dedicated transmission lines.

Terminal 320 can be located in a store or other commercial establishment that accepts card 100 for the purchase of goods or services. Processor 326 can communicate with devices external to terminal 320 such as credit or debit card processing networks (not shown), to which credit or debit card information can be sent and verification for the purchase can be received. This communication can be accomplished using conventional credit and debit card processing methods.

Figure 4A:
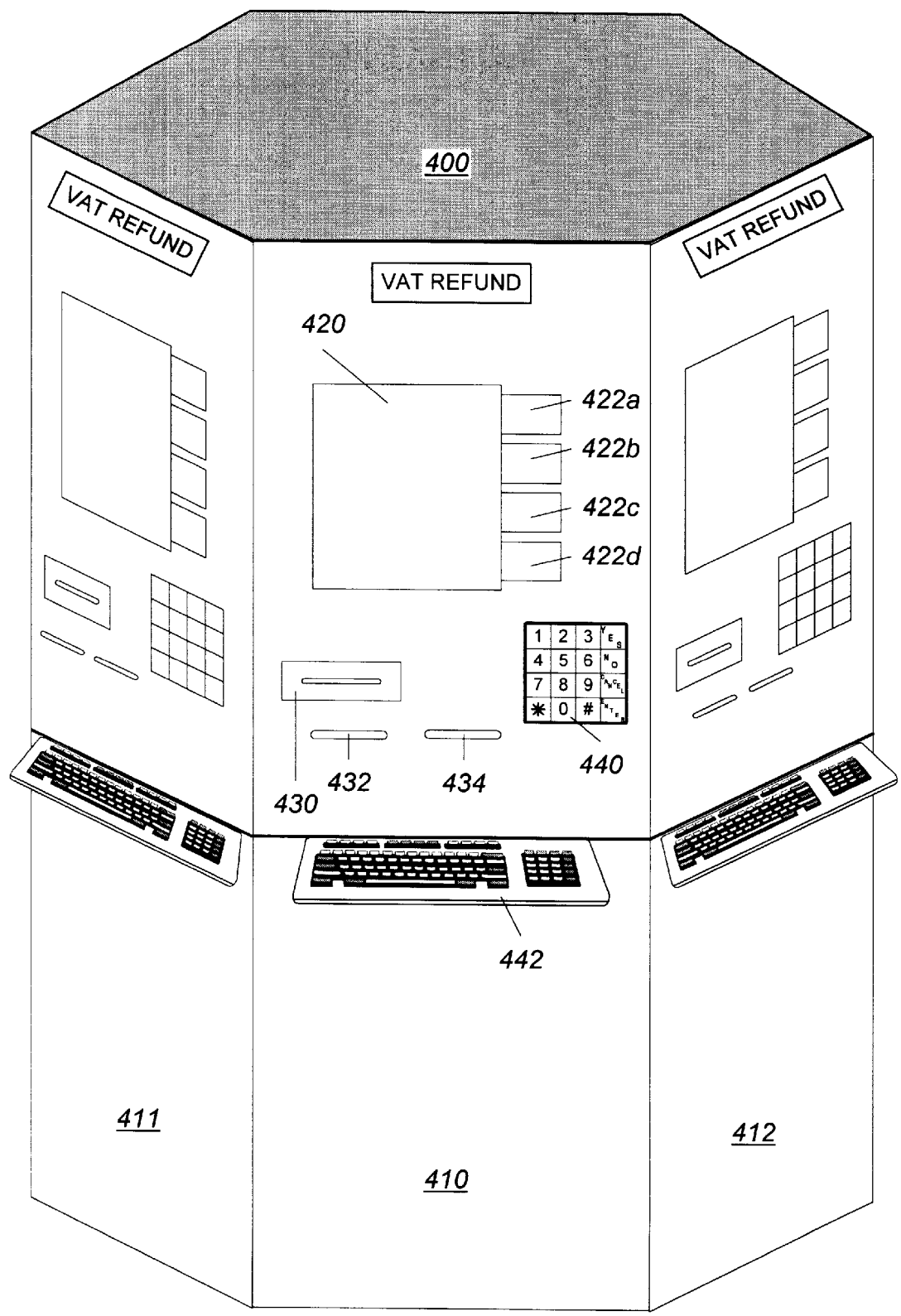
FIG. 4A illustrates a refund terminal for use in the system of FIG. 3.
Figure 4B:
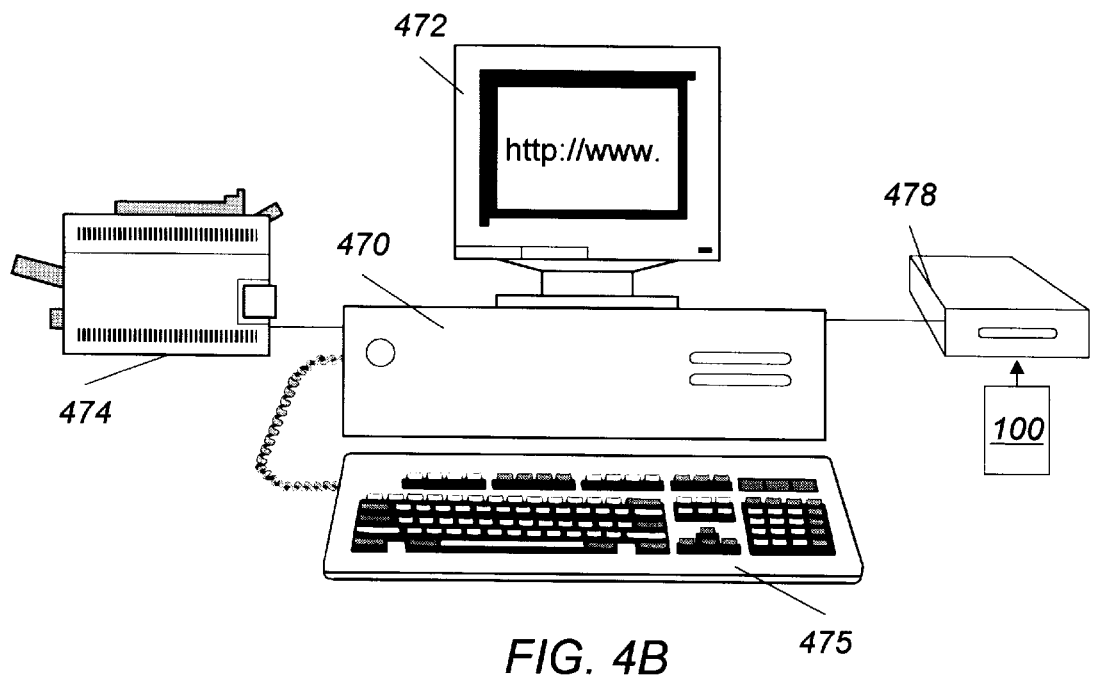
FIG. 4B illustrates a computer operating as a transaction or refund terminal via the Internet for use in the system of FIG. 3.
Figure 4C:
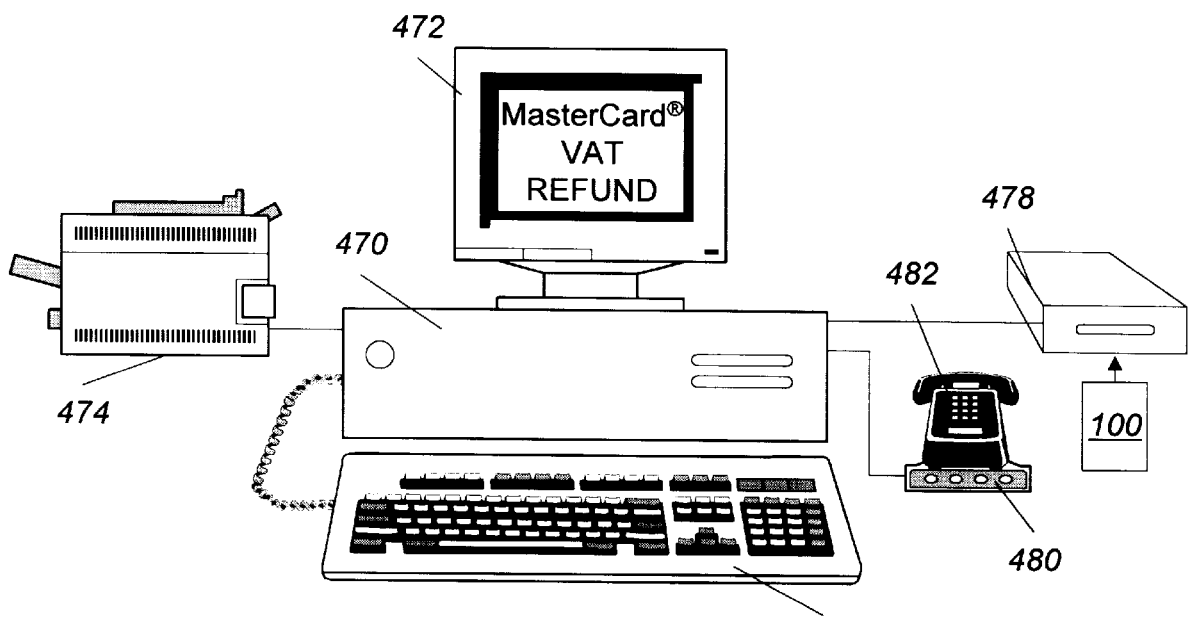
FIG. 4C illustrates a computer operating as a transaction or refund terminal via a telephone and modem for use in the system of FIG. 3.

FIGS. 4A–4C illustrate examples of refund terminals for use in the system of FIG. 3. Kiosk-type terminal 410 shown in FIG. 4A is a preferred embodiment for use in an airport from which a cardholder departs or to which the cardholder arrives. In FIG. 4A, kiosk 400 contains several terminals 410, 411, 412, each of which operates independently. Each terminal 410, 411, 412 includes a display screen 420, interface buttons 422a, 422b, 422c, and 422d, card receptacle 430, keypad 440, receipt dispenser 432, and refund/cash dispenser 434. Optionally, keyboard 442 may be supplied to allow the user to input words to the terminal. Menus are displayed on screen 420 as further described herein in connection with FIGS. 8A–8E. Menu options are chosen using buttons 422a–d. Keys on keypad 440 can include the digits 0–9, special characters ("*" or "#"), and some function keys such as "YES," "NO," "Cancel," and "Enter." These keys can be used for inputting a user's PIN and other information. In addition, instead of choosing menu options using buttons 422a–d, a user may choose an option using the keys on keypad 440 or keyboard 442 (e.g., pressing "1" for the top menu option, "2" for the second menu option, etc.). If the kiosk-type terminal 410 is also used as an Automatic Teller Machine ("ATM"), the keys on keypad 440 could be used to input amounts of money to be dispensed by the machine or monetary value to be placed on the electronic cash portion of card 100.

The configuration of kiosk-type terminal 410 is not limited to that shown in FIG. 4A. FIG. 4A shows six terminals 410, 411, 412 around one kiosk 400—more or fewer terminals may be contained around one kiosk, depending on the space available, the privacy or security desired, or aesthetic tastes of users or airport space planners. Display screen 420 is shown as being fixed and generally flat in FIG. 4A. However, the screen could also be movable or tilted at an angle for better viewing, for more privacy or security, or for more flexibility to accommodate users of varying heights. There may be more or fewer buttons 422a–d than those shown in FIG. 4A, and the buttons could be placed on one or more of the four sides of the screen. The placement of card receptacle 430, receipt dispenser 432, and refund dispenser 434 may also be varied according to user or kiosk-designer preferences for ease of use or for more privacy or security.

In FIG. 4B, a computer 470 operates as a transaction or refund terminal via the Internet. Included with computer 470 is monitor 472, keyboard 475, and printer 474. Connected to the serial port of computer 470 is card reader 478 which accepts card 100. The screen of monitor 472 operates in a manner similar to that of display screen 420 in kiosk-type terminal 410. Likewise, printer 474 operates similarly to receipt dispenser 432, and keyboard 475 operates similarly to keypad 440 or keyboard 442, if available.

The terminal pictured in FIG. 4C is similar to that pictured in FIG. 4B except that computer 470 is connected directly via telephone 482 and (internal or external) modem 480 to the tax recovery application supplier (e.g., MasterCard®, the taxing authority, or the cardholder's bank). Such a terminal would likely require dedicated software to enable the user to communicate with the tax recovery application supplier.

In order to use the terminal pictured in FIG. 4B, the user connects to the Internet via any conventional method and navigates to the World Wide Web site of the tax recovery application supplier. To use the setup pictured in FIG. 4C, the user executes the program instructions to open the dedicated software, and connects via the modem to the tax recovery application supplier. Because the terminals pictured in FIGS. 4B and 4C do not include refund dispenser 434, these terminals may not be used to receive refunds directly in cash, although cash value or credit may be placed on card 100, or be deposited to a cardholder's bank or store deposit account, and it may be possible for a check to be issued via printer 474.

Figure 5:
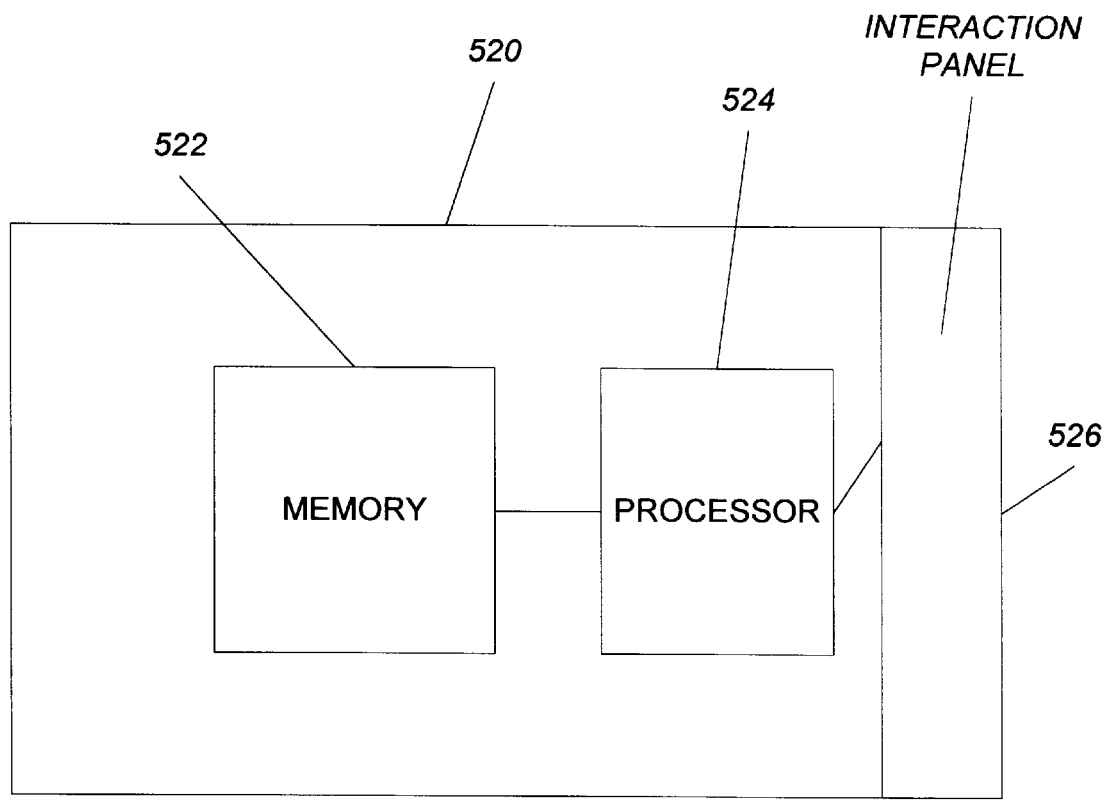
FIG. 5 is a block diagram of the refund terminals illustrated in FIGS. 4A–4C.

FIG. 5 is a block diagram of the transaction or refund terminals illustrated in FIGS. 4A–4C. Each terminal 520 includes processor 524, connected to both memory 522 and interaction panel 526. Interaction panel 526 includes the display screens, the buttons with which menu options are chosen, the keypad or keyboard, the card receptacle or the card reader, the receipt dispenser or printer, and the refund dispenser. Processor 524 processes, controls, and outputs data to interact with the user via interaction panel 526. Processor 524 also controls memory 522 which stores dynamic information such as the options chosen by the cardholder during the current session, and static information such as transaction history, cardholder PIN, and exchange rate history.

Figure 6A:
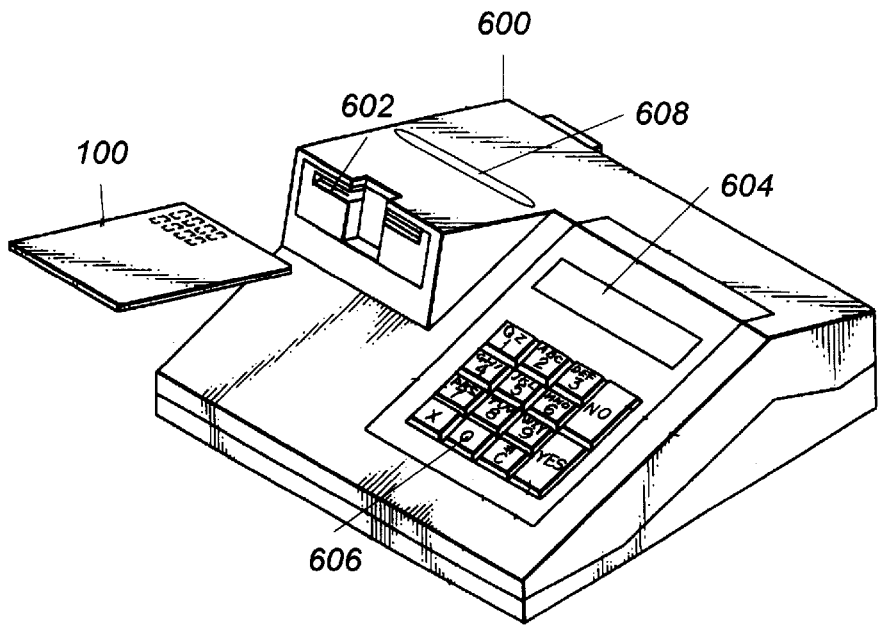
FIG. 6A is an illustration of a point-of-sale transaction terminal.

FIG. 6A illustrates a point-of-sale transaction/recording terminal for use in the refundable tax recovery system. A typical terminal 600 includes a card reader 602, a keypad 606, a display 604, and a receipt dispenser 608. Keypad 606 and display 604 allow a cardholder or a merchant to interact with the terminal. Keypad 606 allows the cardholder or the merchant to select a type of transaction, e.g., credit, debit, or electronic cash, to input a PIN, and to input transactional information. Display 604 allows the cardholder and the merchant to receive informational messages, such as card approvals and authorization codes, and prompts for data entry.

Figure 6B:
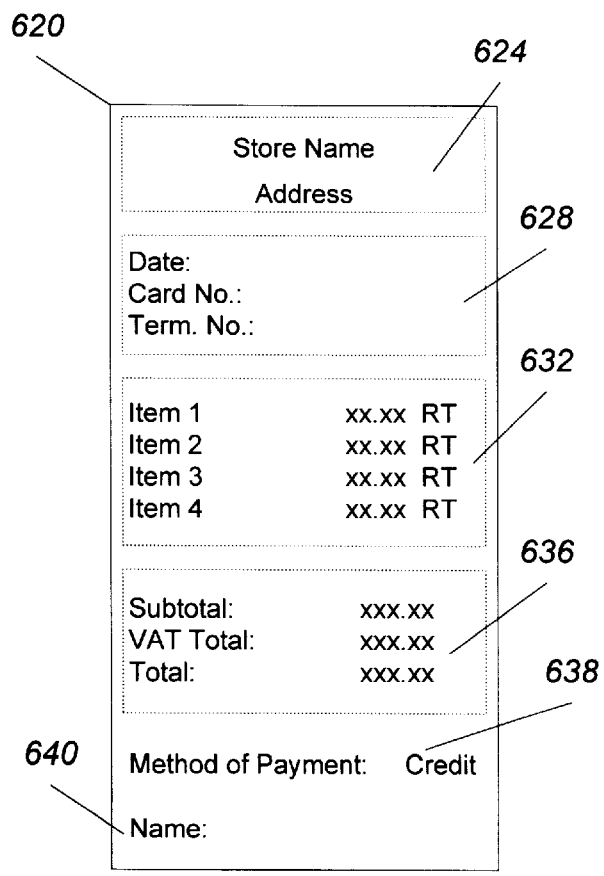
FIG. 6B is an example of a receipt issued by the point-of-sale transaction terminal of FIG. 6A.

FIG. 6B is an example of a receipt 620 issued by transaction/recording 110 terminal 600 via receipt dispenser 608. At the top of receipt 620 is the merchant's name and address 624, below which is general information 628 such as date, card number, and terminal number. As with typical sales receipts, receipt 620 includes a section 632 listing the items bought, the price paid, and whether the item is subject to refundable tax ("RT"). Receipt 620 also includes summary information 636: the items' subtotal, the VAT total, and the transaction total. Finally, receipt 620 includes the method of payment 638 (electronic cash, credit, or debit), and may also include the cardholder's name 640.

Figure 6C:
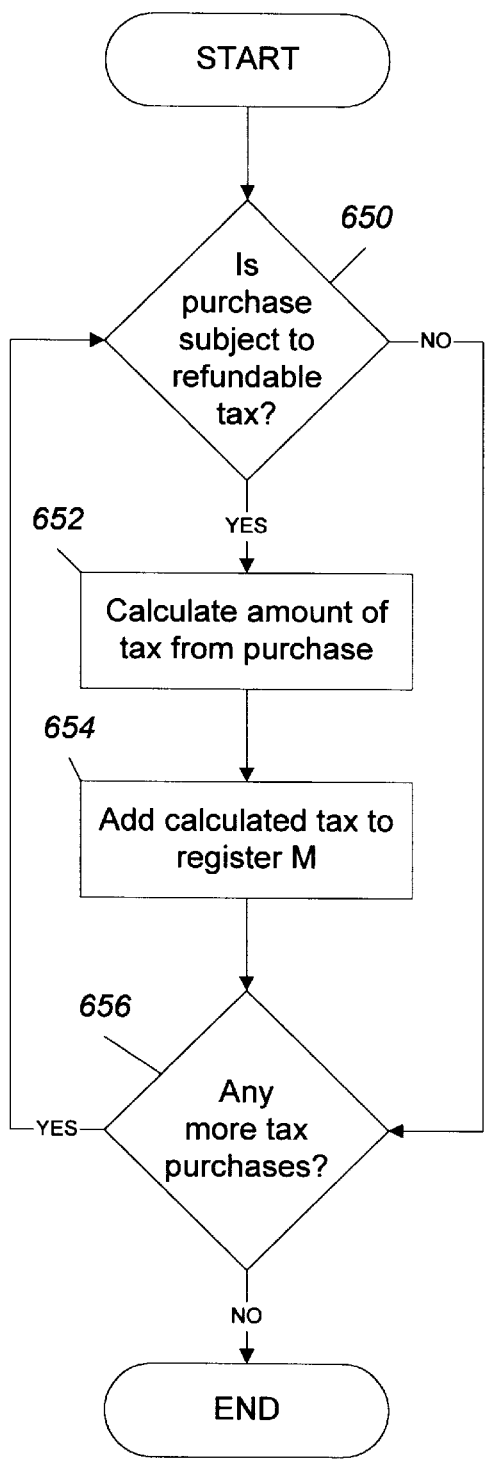
FIG. 6C is a flowchart illustrating the calculation of refundable tax during a point-of-sale transaction.

Processor 326 in FIG. 3 is a schematic of an example of the processor that may be internal to terminal 600. In addition to communicating with external networks and with the interface of terminal 600, processor 326 also provides for transaction data to be stored on card 100 for use later when a refund is desired. In addition, processor 326 enables card 100 to calculate and accumulate the refundable tax during the purchase process. This calculation and accumulation process is illustrated in FIG. 6C. A memory register M located in accounting module 257 in memory unit 250 stores the current accumulated refundable tax paid. Memory register M can be a specified memory location. When the tax recovery application is loaded onto card 100, the amount in register M equals zero. When a purchase is being made, step 650 determines whether the purchase is subject to the refundable tax. Such a determination can be made using rules supplied on either the point-of-sale terminal or through the taxing authority host. If not, step 656 checks for any additional purchases to be made. If the purchase is subject to the refundable tax, step 652 calculates the amount of the tax from the purchase, and step 654 adds the refundable tax to the register M. Next, step 656 determines whether any more purchases are being made during the same checkout process. If so, the process returns to step 650; if not, the process terminates until the next checkout occasion.

Figure 7A:
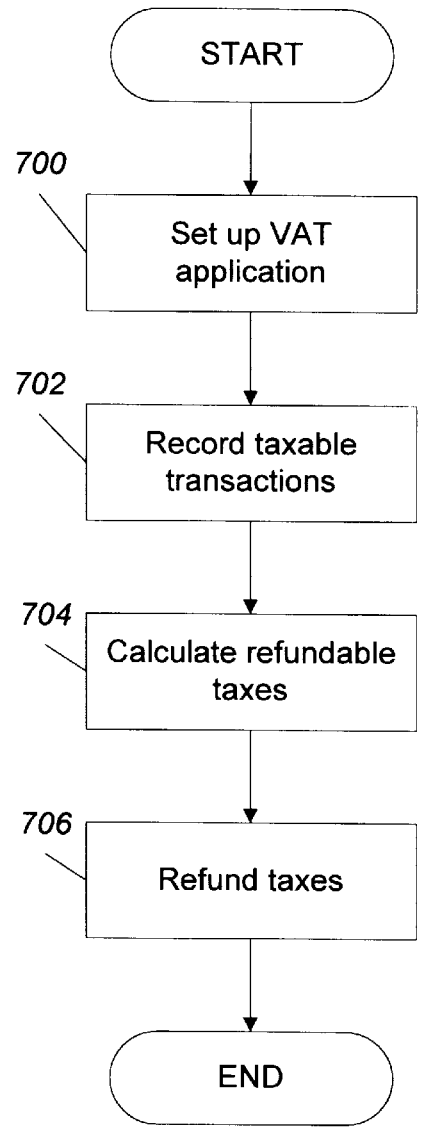
FIG. 7A is a flowchart illustrating a process for recovering refundable taxes using the system of FIG. 3.

The method for recovering refundable taxes involves several processes, described in FIGS. 7A–7D. The general process is shown in FIG. 7A. First, step 700 sets up or loads the tax refund application onto card 100. Next, step 702 records transactions involving refundable taxes. Third, step 704 calculates the refundable taxes, and fourth, step 706 refunds the taxes to the cardholder.

Figure 7B:
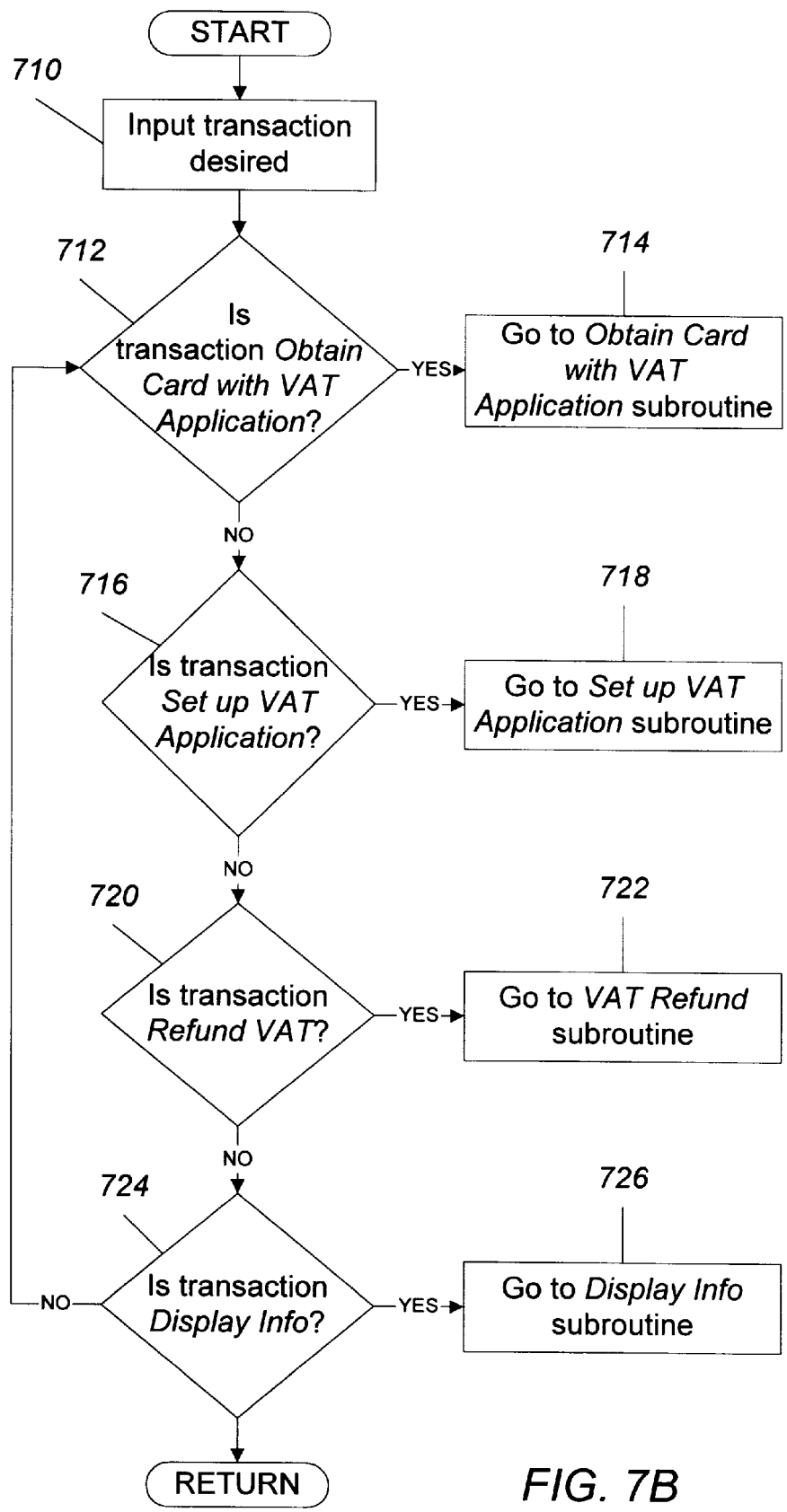
FIG. 7B is a flowchart illustrating a process using the terminals of FIGS. 4A–4C.

Steps 702 and 704 have been described in FIGS. 6A–6C and the discussion accompanying those figures. Steps 700 and 706 are implemented using the terminals of FIGS. 4A–4C, sample menu screens of which are illustrated in FIGS. 8A–8E. The Main Menu screen 810 is shown in FIG. 8A, and the process associated with it is illustrated in FIG. 7B. First, the menu screen shows-four options: obtaining a card 100 including the tax recovery application, setting up the VAT application on an existing card, refunding the VAT paid, or displaying VAT transaction information. These options are respectively chosen by pressing one of buttons 812, 814, 816, 818. These buttons are used with the kiosk-type terminal 410 shown in FIG. 4A. If the cardholder is using one of the computer terminals shown in FIGS. 4B and 4C, instead of buttons 812, 814, 816, 818, the terminal may prompt the user to type in, for example, 1, 2, 3, or 4, or possibly use the function keys, F1, F2, F3, F4, etc.

In the flowchart of FIG. 7B, choosing one of the four options is represented by step 710 in which the user inputs the transaction desired. Step 712 determines if the user pressed button 812 indicating obtaining a card with the VAT application. If so, step 714 proceeds to the subroutine to obtain a card with the VAT application, described in FIG. 7C. If this option is not chosen, step 716 determines if the user pressed button 814 to indicate setting up of the VAT application. If so, step 718 proceeds to the VAT setup application subroutine, also described in FIG. 7C. If this second option is not chosen, step 720 determines if the user pressed button 816 to indicate refunding of the tax. If that is the case, step 722 proceeds to the VAT refund subroutine, described in FIG. 7D. If none of these functions is chosen, step 724 determines whether the user pressed button 818 to choose to display the VAT information to date. If so, step 726 proceeds to the display information subroutine, also described in FIG. 7D. If none of these four options is selected, the process loops back to step 712 (or to step 710, if desired) to determine whether any of buttons 812, 814, 816, 818 has been pressed. In addition, although FIG. 8A only shows these four options, other options could be available in Main Menu 810, and they would become part of the process in FIG. 7B.

The tax refund application may be initiated in several ways. In a preferred scenario, a traveler who does not own a transaction card capable of using the tax refund application may want to acquire a card for the express purpose of availing himself of the convenient VAT refund features. An obvious benefit of such an option is to introduce a previous non-cardholder to the transaction card system in general, such as to a card system using the MONDEX™ electronic cash application, and the tax refund application system in particular. In another scenario, the traveler holds a card that is already capable of using a tax refund application, and some time after the cardholder acquires the card, the cardholder would desire to use the tax refund application.

Figure 7C:
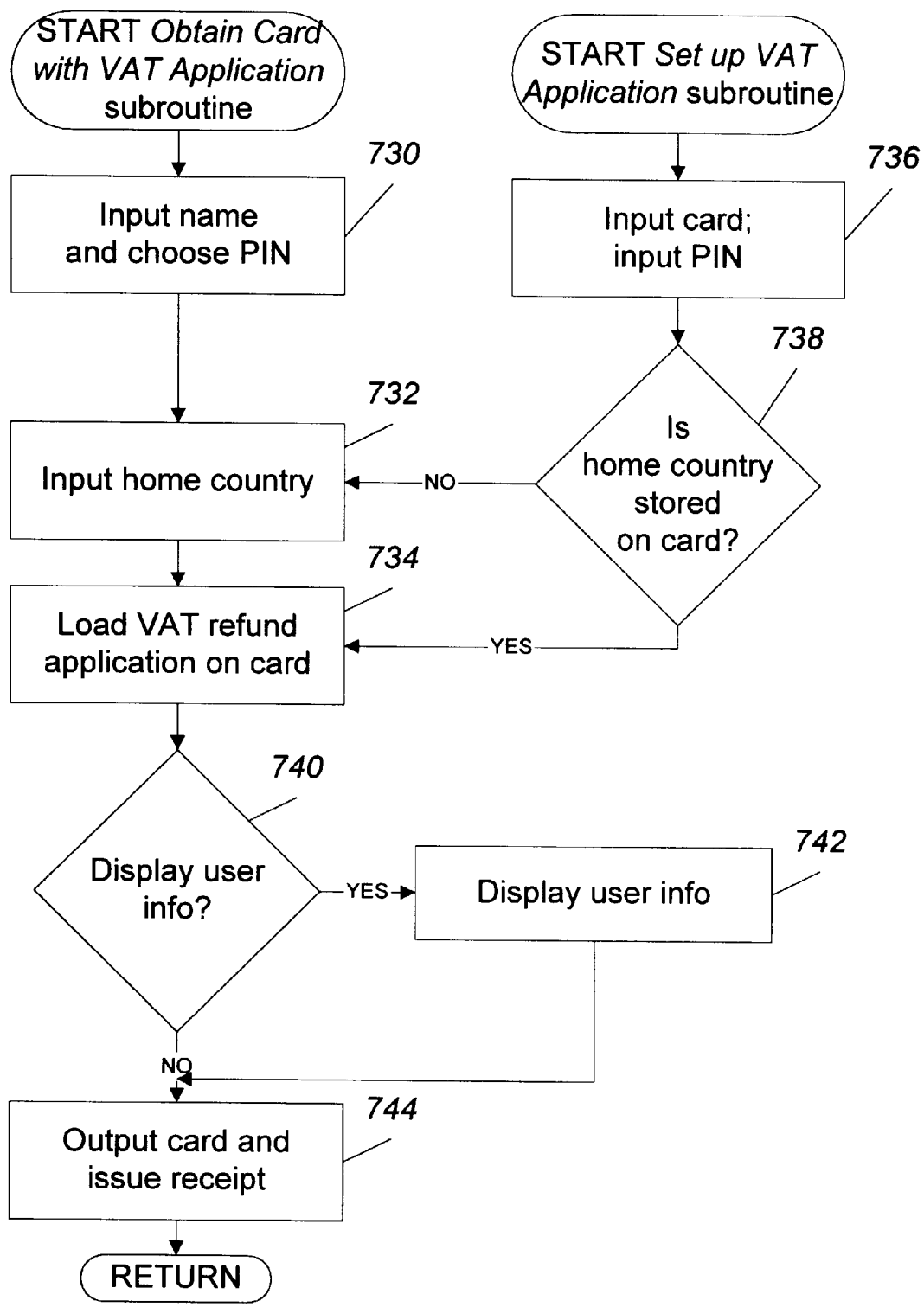
FIGS. 7C and 7D are flowcharts illustrating subsidiary processes in the process of FIG. 7B.

Both of these scenarios are illustrated in FIG. 7C. FIG. 7C is a flowchart describing the subroutines to obtain the card with the VAT application and to set up the VAT application on an existing card. These subroutines share a number of steps. FIG. 8B depicts the menu screen associated with the subroutine to obtain the card, and a similar menu screen is used for the VAT application setup subroutine. Menu screen 820 shows three options respectively chosen by pressing one of buttons 822, 824, 826: inputting the user's name and choosing a PIN, inputting the user's home country, and displaying the user's information. Step 730 represents the prospective cardholder choosing the first option to input his or her name, preferably performed using keyboard 442. The process then prompts the user for a PIN, which the user can input using either keyboard 442 or keypad 440. Step 732 represents choosing the next option to input to the terminal the user's home country. Once button 824 is pressed, the terminal prompts the user to type in the home country's name or abbreviation on keyboard 442. Step 734 then loads the VAT refund application onto card 100.

At this point, step 740 asks if the user information should be displayed on the terminal screen, which choice is indicated by the user pressing button 826. If that is the case, step 742 displays the information, which would include at least the user's name, home country, and whether the tax recovery application was loaded. After the information is displayed on the screen, or if the user did not choose to display the information, step 744 outputs the card to the user and issues a receipt. For added security, the terminal would prompt the user to sign the newly-issued card. The card is now ready to be used to make purchases subject to refundable tax.

The subroutine to set up the VAT application on an existing card differs from the subroutine to obtain the card only in the initial steps because the cardholder's name and PIN should already be stored on the card. Thus, in step 736, the cardholder places the card in the terminal and inputs the PIN on keyboard 442 or keypad 440. Step 738 checks whether the home country information is stored on the card. In the case of a credit card or a cash card, the home country is not likely stored on the card, and step 732 would prompt the user to input the home country. If the home country is stored on the card, for example, if the card previously contained a tax recovery application or some other application requiring the cardholder's home address, step 734 loads the VAT refund application on the card. The other steps of this subroutine are the same as for the subroutine to obtain the card, except that when the terminal returns the card, there is no need to prompt the user to sign the card.

The process depicted in FIG. 7C is directed to a tax recovery application that is capable of recovering refundable taxes for many countries. In a variation of the present invention, the tax recovery application is country-specific. In this variation, after step 732, the subroutine would prompt the user to input the name of the taxing country whose tax recovery application the user wants to load onto the card. At this point, it is possible to include a step that checks whether the home country and the taxing country are the same, because a return of VAT is usually only available to non-residents of a country. If the taxing country and the home country are the same, the process displays an error, does not allow the tax recovery application for that country to be loaded onto the card, and either returns the card or prompts for the user to input another taxing country. If the taxing country and the home country are different, the process might determine whether a VAT refund application for that taxing country has already been loaded onto the card, in which case the process would return an error to that effect. The process could also include other safeguards or security features which might depend on the VAT refund restrictions for each country, but could include making sure that the cardholder has not been in the taxing country more than a requisite number of days or not allowing a cardholder to load an application within so many days of when the last application for the same taxing country was loaded. Once these checks are completed, the process continues with step 734 to load the VAT refund application onto the card. In the preferred multiple-country application, these checks and security measures would be performed during the refunding subroutine, described below.

In the single-country application variation, once the tax recovery application for a taxing country was loaded, the process could prompt the user to set up a VAT application for more than one country. This option may be useful if the user is visiting several countries on one trip. If the user wants to load another country's tax recovery application, the process would allow the user to input the next taxing country. When the user is finished loading country-specific applications, step 740 would again prompt to display the user information, which in this case might include the countries for which the tax recovery application has been loaded. When the subroutine is completed, step 744 again returns the card and in this case issues a receipt listing the taxing country or countries for which the VAT refund application has been loaded.

Some cardholders may own more than one card capable of using the tax refund application. In accordance with the country-specific variation, in such cases another function that the VAT application setup subroutine could perform is to consolidate VAT information that the cardholder may have, for example, loaded while using the Internet terminal or modem-based connection. In addition, a cardholder may want to consolidate on one card tax refund applications for different countries (or even the same country, if that does not violate that country's regulations) that are on different cards.

An example of a receipt 910 from the subroutines to obtain a card loaded with the VAT refund application and to set up a VAT refund application is shown in FIG. 9A. Included is a title 912, "VAT Refund Application," for any transactions associated with the VAT embodiment of the present invention. Section 914 of the receipt lists general information such as date, card number, terminal number, and terminal location. Section 916 indicates that receipt 910 records the setting up of a VAT refund application, and it could also indicate that the user obtained the card during the transaction. Section 918 lists the home country. In the country-specific variation, section 918 also includes the taxing country or countries whose tax recovery application has been loaded, and possibly exchange rate information to convert the home country's currency to that of each of the taxing countries. Finally, the cardholder's name 920 may be included on receipt 910.

Figures 1, 7D:
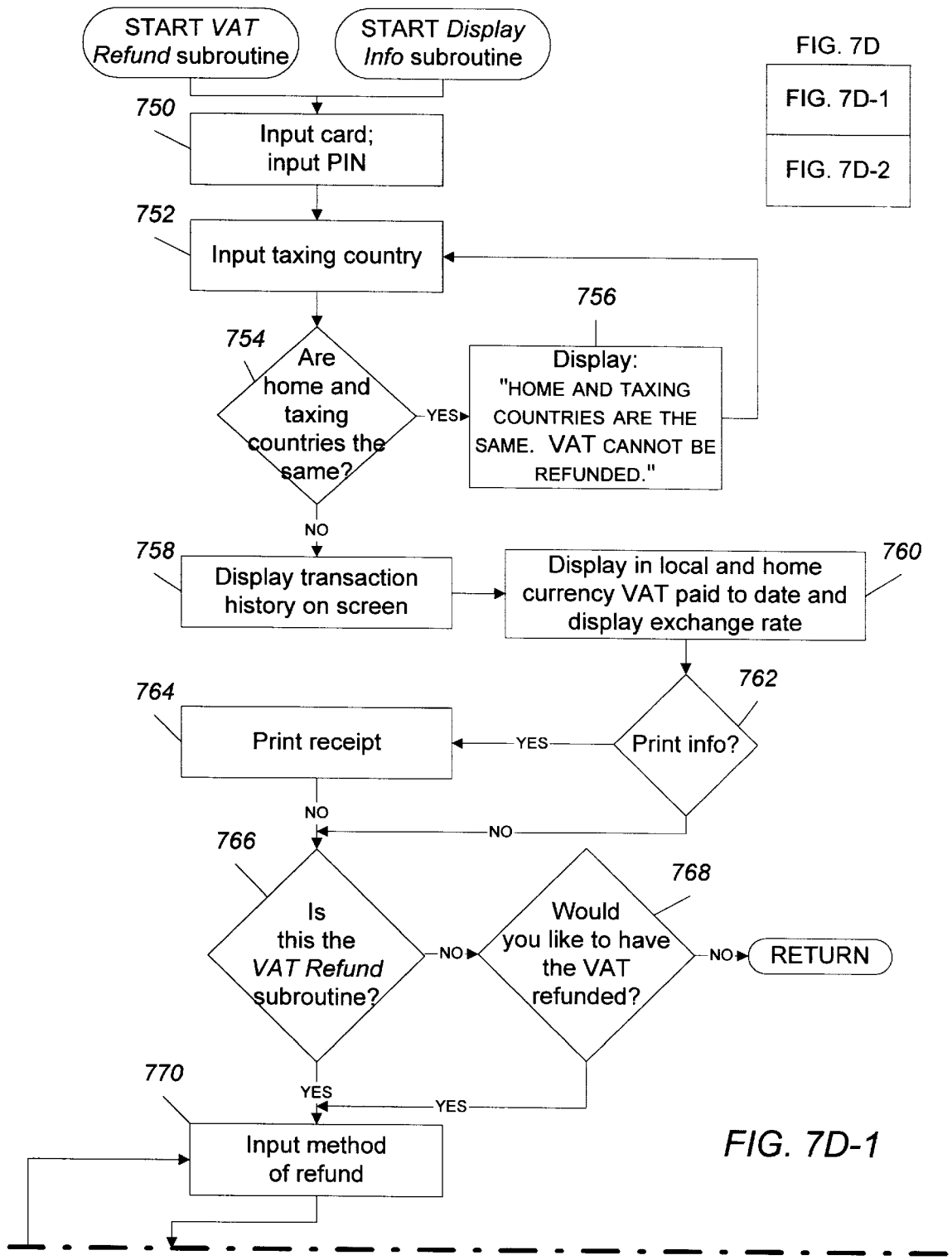
Figures 2, 7D:
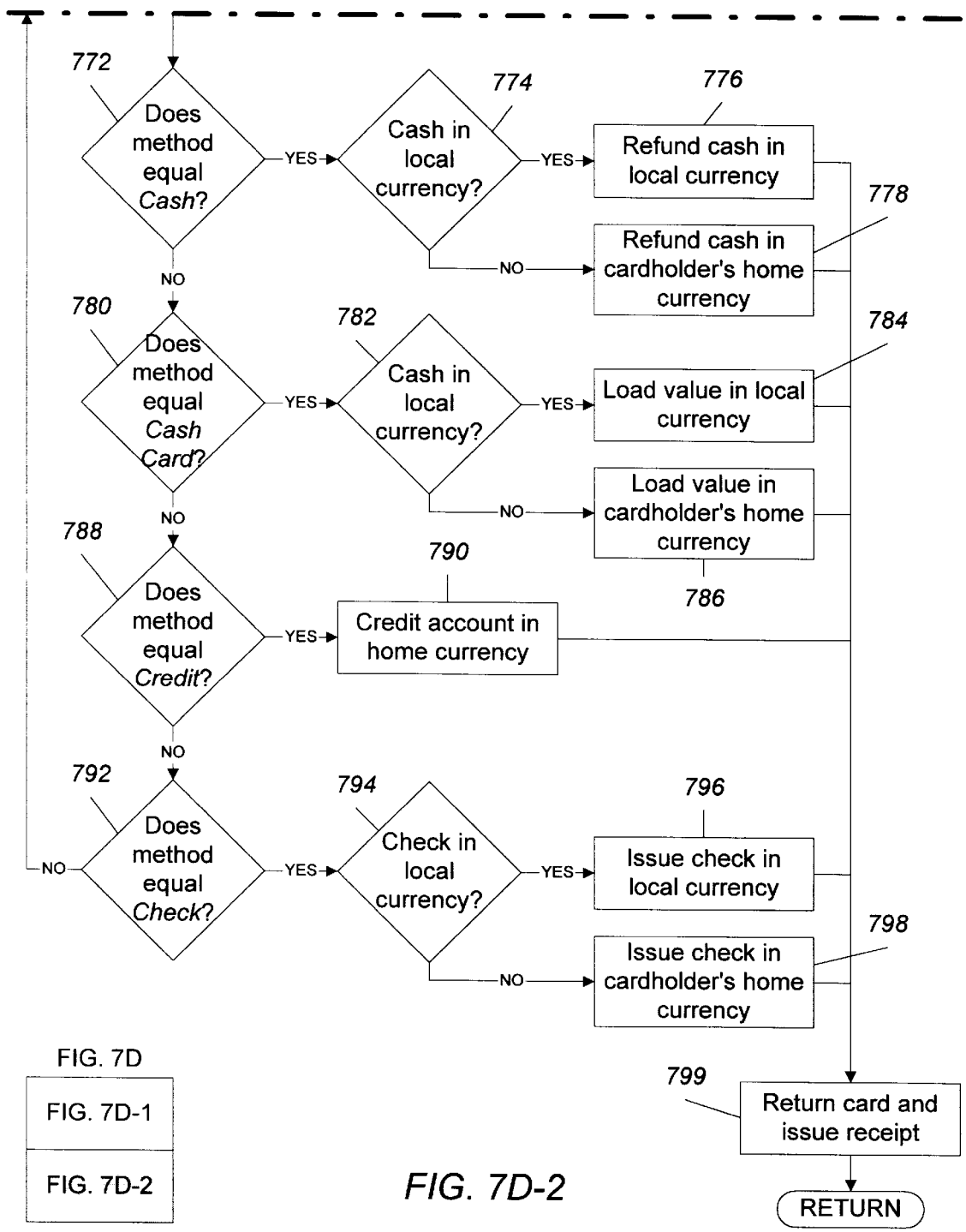

FIG. 7D is a flowchart describing the VAT refund subroutine called in step 722 and the display information subroutine called in step 726, and FIGS. 8C–8E depict menu screens associated with these subroutines. Instead of actually requesting a refund for refundable tax paid in a particular country, a user may merely want to display VAT information for all the countries included in a tax recovery application.

Both subroutines have common initial steps. When these subroutines are first invoked, step 750 prompts the cardholder to place the card in the terminal and input the user's PIN on keyboard 442 or keypad 440. Step 752 asks the user to input the country from which a tax refund is requested. Step 754 performs a preliminary check to make sure that the home country stored on the card and the taxing country inputted by the user are not the same. If they are, step 756 displays an error message stating that the tax cannot be refunded, and returns the user to step 752 to input a different taxing country. This step is not needed in the country-specific variation, because that check was performed when the tax recovery application for the specific country was initially loaded onto the card. Other checks that were performed during the initial loading of the country-specific applications can be performed at this point (i.e., after step 754) in the preferred multiple-country application embodiment.

Once these preliminary checks have been completed, step 758 displays the cardholder's transaction history on the terminal screen as depicted in FIG. 8C on menu screen 830. Screen area 832 lists the taxing country and itemizes all purchases that are subject to that country's refundable tax and includes the date of the transaction, the merchant name and (possibly) address, the price paid for each item, and the amount of refundable tax paid for each item. As described in the flowchart of FIG. 6C, while recording transactions, card 100 calculates and accumulates the amount of VAT paid. Step 760 displays in both the local and the home currencies the amount of VAT paid so far by the cardholder, and may also list the current exchange rate used to determine the home currency value. Step 762 determines whether the user wants a printout of the transaction information displayed so far. If so, the user presses button 834, and step 764 prints the information on a receipt. Alternatively, the user can wait until after the refund is completed to receive a receipt.

An example of a receipt that is issued at this point is shown in FIG. 9B. Receipt 930 includes the same general information as listed in section 914 on receipt 910: date, card number, terminal number, and terminal location. Section 934 includes the taxing country and indicates that receipt 930 is printing the VAT transaction information for that country. Section 938 then prints the details included on menu screen 830: date of transaction, merchant name and address, the price of the item subject to refundable tax, and the amount of refundable tax. Section 940 summarizes the total tax paid, in both the local and the cardholder's home currencies, as well as the current exchange rate. Again, the cardholder's name 942 may be included on receipt 930.

After these preliminary matters are taken care of, step 766 determines whether the VAT refund subroutine or the display information subroutine was invoked. If the latter, step 768 gives the user the option of obtaining a VAT refund. If this option is not desired, the display information subroutine ends.

If the user does decide to obtain a refund, the user is placed into the VAT refund subroutine. Before carrying out these steps, the process may include some measures in accordance with the taxing country's rules or restrictions such as only allowing a refund in the airport or after the cardholder leaves the country. Assuming it is acceptable to refund the VAT, step 770 prompts the user to input the method of refund. The options are shown in menu screen 840 in FIG. 8D: the VAT may be refunded, for example, in cash, by adding electronic cash value to card 100, by crediting the credit card portion of card 100, or by issuing a check. If the cardholder is invoking this process from a personal computer terminal, the "cash" option is not available. If the cardholder is at kiosk-type terminal 410, step 772 determines whether the user has pressed button 842 to choose "cash." If so, the user is presented with menu screen 850 in FIG. 8E, and step 774 determines whether the user desires cash in local currency or the cardholder's home currency. If the cardholder presses button 852, step 776 refunds the tax in local currency; if the cardholder presses button 854, step 778 refunds the cash in the cardholder's home currency. After dispensing the cash, step 799 returns the card and issues a receipt.

If the user did not choose "cash" in step 772, step 780 determines whether the user has pressed button 844 to add the value of the refund to the "cash card." Again, the user is presented with menu screen 850, and step 782 determines whether the user chooses cash value in either local currency or the cardholder's home currency. If in local currency, step 784 adds value to card 100 in local currency; if the cardholder chooses "home currency," step 786 adds value to card 100 in that currency. Again, after refunding the tax, step 799 returns the card and issues a receipt.

If the user did not choose "cash" or "cash card," step 788 determines whether the user pressed button 846 to choose "credit." If so, because credit is typically only given in the cardholder's home currency, no inquiry is required as to what currency to use. Thus, step 790 credits the amount of refundable tax to the cardholder's credit card account, and step 799 returns the card and issues a receipt.

Finally, if the user did not choose "cash," "cash card," or "credit," step 792 determines whether the user pressed button 848 to choose "check." If so, the user again has the choice of local or home currency. If, in response to step 794, the user requests a check in local currency, step 796 will issue a check in that currency, payable to the cardholder. If the user requests a check in the home currency, step 790 will issue a check in that currency. Then, step 799 will issue a receipt.

If the user does not make any choices, the flowchart loops back to step 770 to initiate the method of refund.

An example of a receipt that is issued after the tax is refunded is shown in FIG. 9C. The top portion of receipt 950 is the same as that of receipt 930, except that section 954 indicates that receipt 950 is printing the refunded VAT information for the selected taxing country. Section 958 is the same as section 938 in receipt 930. Section 960 indicates the amount of tax refunded and in what currency it was refunded, as well as the current exchange rate and the method in which it was refunded. Finally, the cardholder's name 964 may be included on receipt 950.

Although the present invention has been described with reference to certain preferred embodiments, various modifications, alterations, and substitutions will be known or obvious to those skilled in the art without departing from the spirit and scope of the invention, as defined by the appended claims.

I claim:

1. A method for recovering a refundable tax related to a purchase transaction using a transaction card, comprising the steps of:

storing a tax recovery application on said card;

storing on said card purchase transaction data related to said purchase transaction; and calculating on said card, in response to said purchase transaction data, said refundable tax, using said tax recovery application.

2. The method according to claim 1 further comprising the step of providing said refundable tax to a user of said card.

3. The method according to claim 2 wherein said step of providing said refundable tax to said card user is selected from the group consisting of dispensing cash to said card user, adding cash value to said card, crediting the credit card account of said user with the value of said refundable tax, and issuing a check to said card user.

4. The method according to claim 2 wherein said refundable tax can be refunded in either the currency of a taxing country from which said tax is refunded or the currency of the country in which said card user resides.

5. The method according to claim 1 wherein said refundable tax is a value-added tax.

6. The method according to claim 1 wherein said tax recovery application storing step comprises the steps of:

determining a home country of a user of said card; and placing said tax recovery application on said card.

7. The method according to claim 1 wherein said tax recovery application storing step can be performed either at the time said card is obtained or after said card is obtained.

8. The method according to claim 1 wherein said related purchase transaction data comprise:

the date of said transaction;

the price charged for said transaction;

the country levying said refundable tax on said purchase; and the amount of said refundable tax paid in association with said transaction.

9. The method according to claim 1 wherein said calculating step comprises the steps of:
- determining whether said purchase transaction is subject to said refundable tax;
- calculating the amount of refundable tax associated with said transaction; and
- adding said refundable tax amount to an amount of refundable tax stored in a memory register of said card.

10. The method according to claim 1 wherein said tax recovery application can be used to recover refundable taxes paid to more than one country.

11. A system for recovering a refundable tax related to a purchase transaction, said system comprising:
- a transaction card;
- a transaction terminal for inserting said card, executing said purchase transaction, and generating purchase transaction data; and
- a tax recovery application stored on said card which calculates on said card, in response to said purchase transaction data, said refundable tax.

12. The system according to claim 11 further comprising means for providing said refundable tax to a user of said card.

13. The system according to claim 11 wherein said refundable tax is a value-added tax.

14. The system according to claim 11 wherein said transaction terminal transfers said tax recovery application from an application provider to said card.

15. The system according to claim 11 wherein said tax recovery application is stored on said card either at the time said card is obtained or after said card is obtained.

16. A transaction card for recovering a refundable tax related to a purchase transaction, said card comprising:
- means for storing a tax recovery application;
- means for transferring data related to said purchase transaction from an electronic purchasing terminal to said card;
- means for calculating on said card, in response to said purchase transaction data, said refundable tax, using said tax recovery application; and
- means for transferring refundable tax data from said card to an electronic refund terminal.

17. The card as specified in claim 16 further comprising means for storing the cash value of said refundable tax.

18. The card as specified in claim 17 wherein said cash value is stored in either the currency of a taxing country from which said tax is refunded or the currency of the country in which a user of said card resides.

19. The card as specified in claim 16 wherein said refundable tax is a value-added tax.

20. The card as specified in claim 16 wherein said electronic refund terminal is selected from the group consisting of an automated teller machine-type terminal, a computer connected to the Internet, and a computer connected via a modem to a provider of said tax recovery application.

\* \* \* \* \*